Figure 1:
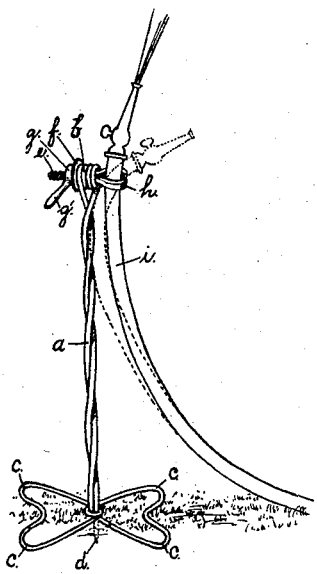

No. 889,419. PATENTED JUNE 2, 1908.
L. E. WHITNEY.
SUPPORT FOR LAWN HOSE.
APPLICATION FILED MAY 29, 1906.

WITNESSES, INVENTOR,
L. E. Whitney
BY
ATTORNEY

UNITED STATES PATENT OFFICE.

LAWRENCE E. WHITNEY, OF CARTHAGE, MISSOURI.

SUPPORT FOR LAWN-HOSE.

No. 889,419.  Specification of Letters Patent.  Patented June 2, 1908.

Application filed May 29, 1906. Serial No. 319,274.

*To all whom it may concern:*

Be it known that I, LAWRENCE E. WHITNEY, a citizen of the United States, residing at Carthage, in the county of Jasper and State of Missouri, have invented certain new and useful Improvements in Supports for Lawn-Hose, of which the following is a specification, reference being had therein to the accompanying drawing.

This invention provides simple and easily adjustable and transportable means for supporting a lawn hose at or near its end, so that the same is securely held in any desired position during the operation of sprinkling.

The details of construction and arrangement of parts contemplated by this invention are disclosed in the accompanying drawings, forming part hereof, wherein a preferable embodiment of the invention is shown, for purposes of illustration.

In the drawings, like reference characters refer to corresponding parts in the several views whereof—

Figure 2:
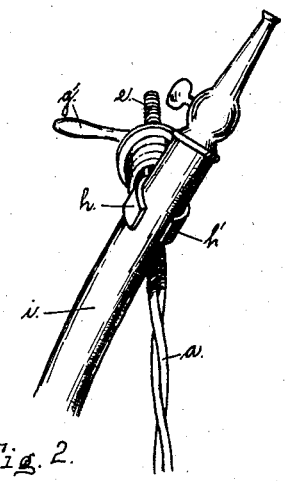
Figure 3:
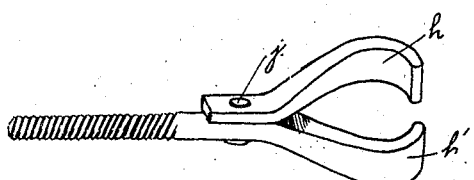
Figure 4:
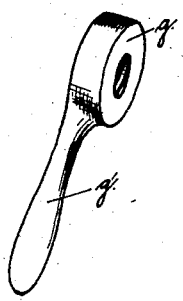
Figure 5:
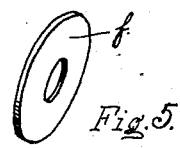

Figure 1 is a view showing the support in place and supporting a lawn-hose; Fig. 2 is an enlarged view of the hose-clutching means; Fig. 3 is a view of the clamp; Fig. 4 is a view of the handle-nut; and Fig. 5 is a view of the washer.

Referring more particularly to the drawings, $a$ designates the support proper, which is formed of wire or similar suitable material. The material of the support is bent to form a downwardly-projecting pin $d$ which is adapted to be forced into the ground to hold the support in place; radially-arranged laterally-projecting portions $c$ arranged to rest on the surface of the ground to limit the distance pin $d$ is inserted into the ground and to steady the device; and an upright twisted standard at the end of which is a coiled portion $b$ constituting a substantially horizontal passage. The pin $d$ and the twisted standard form together a straight continuous shank. A clamp comprising a screw-threaded shank, a rigid jaw $h^1$ integrally formed therewith, and a similar jaw $h$ pivoted to the shank by a pin $j$, is adapted to be disposed within the coiled portion $b$. A member comprising a nut portion $g$ and a handle portion $g^1$ is arranged to be screwed onto the shank of the clamp. As this nut engages the coiled portion $b$, the clamp-jaws are drawn inwardly with respect to the coiled portion and forced toward each other so that they clamp and hold the hose $i$ grasped thereby. A washer $f$ is disposed on the shank of the clamp and interposed between portion $g$ and coiled portion $b$.

Having thus described my invention, what I claim as new and desire to secure by Letters Patent is—

A garden-hose support fabricated of wire spirally bent into a close coil intermediate its ends forming a substantially horizontal continuous opening, and the remaining portion of the wire twisted together to form a straight continuous shank with an end arranged to enter the ground and to form radially-arranged laterally-extending portions above said end arranged to rest on the surface of the ground, in combination with means associated with said opening for clamping a hose.

In testimony whereof I affix my signature in presence of two witnesses.

LAWRENCE E. WHITNEY.

Witnesses:
 PANSY CLIFTON,
 M. C. McVERNEY.